United States Patent
Sugita

(10) Patent No.: US 6,775,731 B2
(45) Date of Patent: Aug. 10, 2004

(54) COMPUTER SYSTEM WITH EXTENSION UNIT CONNECTED TO PERIPHERAL EQUIPMENT

(75) Inventor: Takami Sugita, Ome (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 407 days.

(21) Appl. No.: 09/788,401

(22) Filed: Feb. 21, 2001

(65) Prior Publication Data

US 2001/0029539 A1 Oct. 11, 2001

(30) Foreign Application Priority Data

Feb. 22, 2000 (JP) ........................................ 2000-044582

(51) Int. Cl.$^7$ .............................. G06F 3/00; G06F 9/00; G06F 13/42
(52) U.S. Cl. ........................ 710/305; 710/300; 710/71; 361/730
(58) Field of Search ......................... 710/100, 71, 305, 710/4, 62, 72, 313, 300, 61; 712/29; 711/100; 347/168; 358/11; 398/140; 369/47.1; 360/39; 700/1, 90; 361/730

(56) References Cited

U.S. PATENT DOCUMENTS

| 4,896,311 | A | * | 1/1990 | Ishihara |
| 5,045,869 | A | * | 9/1991 | Isaka et al. |
| 5,206,946 | A | * | 4/1993 | Brunk |
| 5,361,329 | A | * | 11/1994 | Morita et al. |

FOREIGN PATENT DOCUMENTS

JP          9-237141          9/1997

* cited by examiner

Primary Examiner—Gopal C. Ray
(74) Attorney, Agent, or Firm—Finnegan, Henderson, Farabow, Garrett & Dunner, L.L.P.

(57) ABSTRACT

Among plural types of signals sent/received between a computer (PC) and a extension unit (extension adapter), a predetermined signal group is converted to a serial data and delivered through a serial bus, and a specific signal directly affecting the operational-speed is directly delivered through a direct signal line so that the number of connection signals between the computer and the extension unit is reduced while keeping the operational-speed from lowering, a connector can be made smaller, and the device constitution of the entire system can be compact.

7 Claims, 4 Drawing Sheets

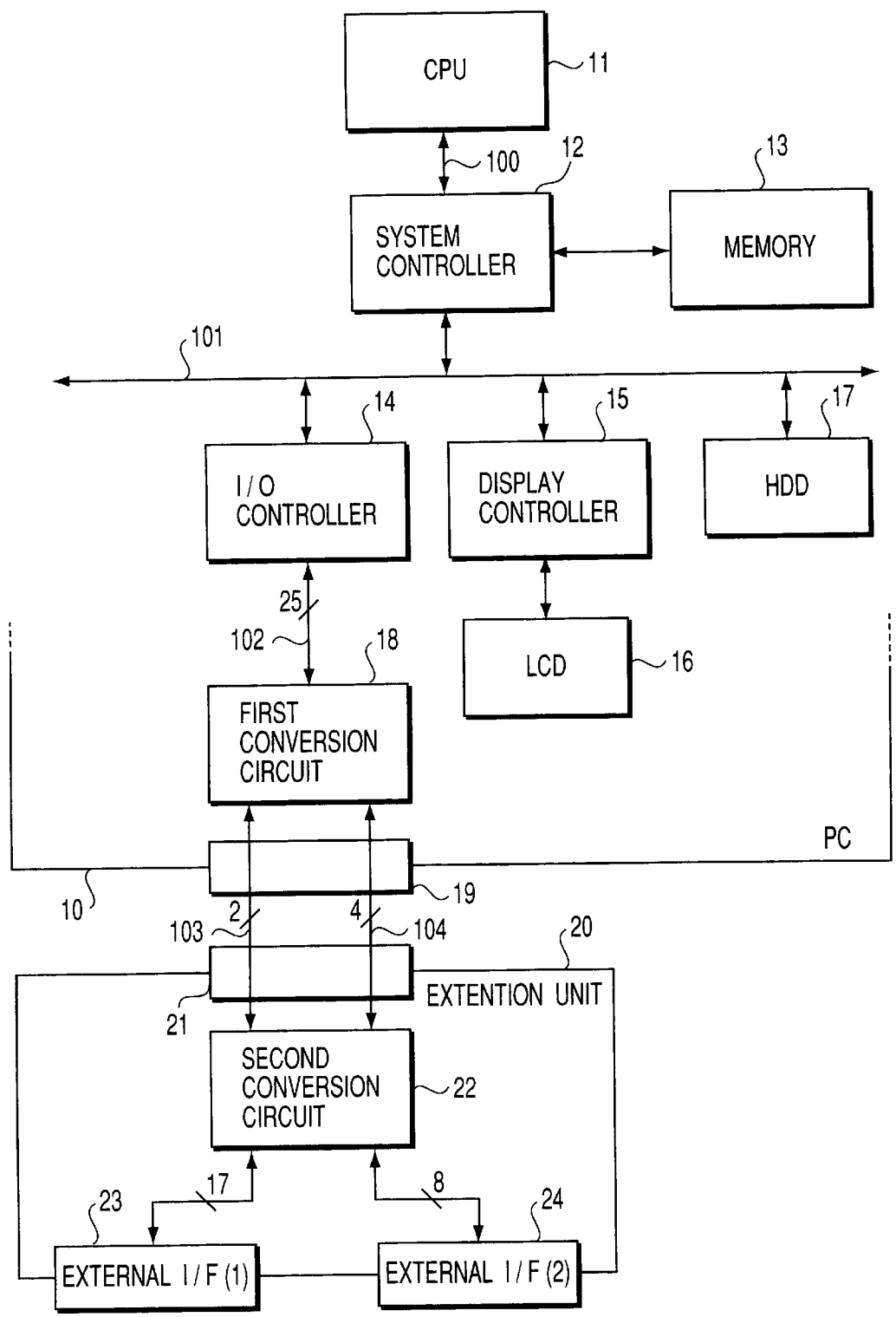
F I G. 1

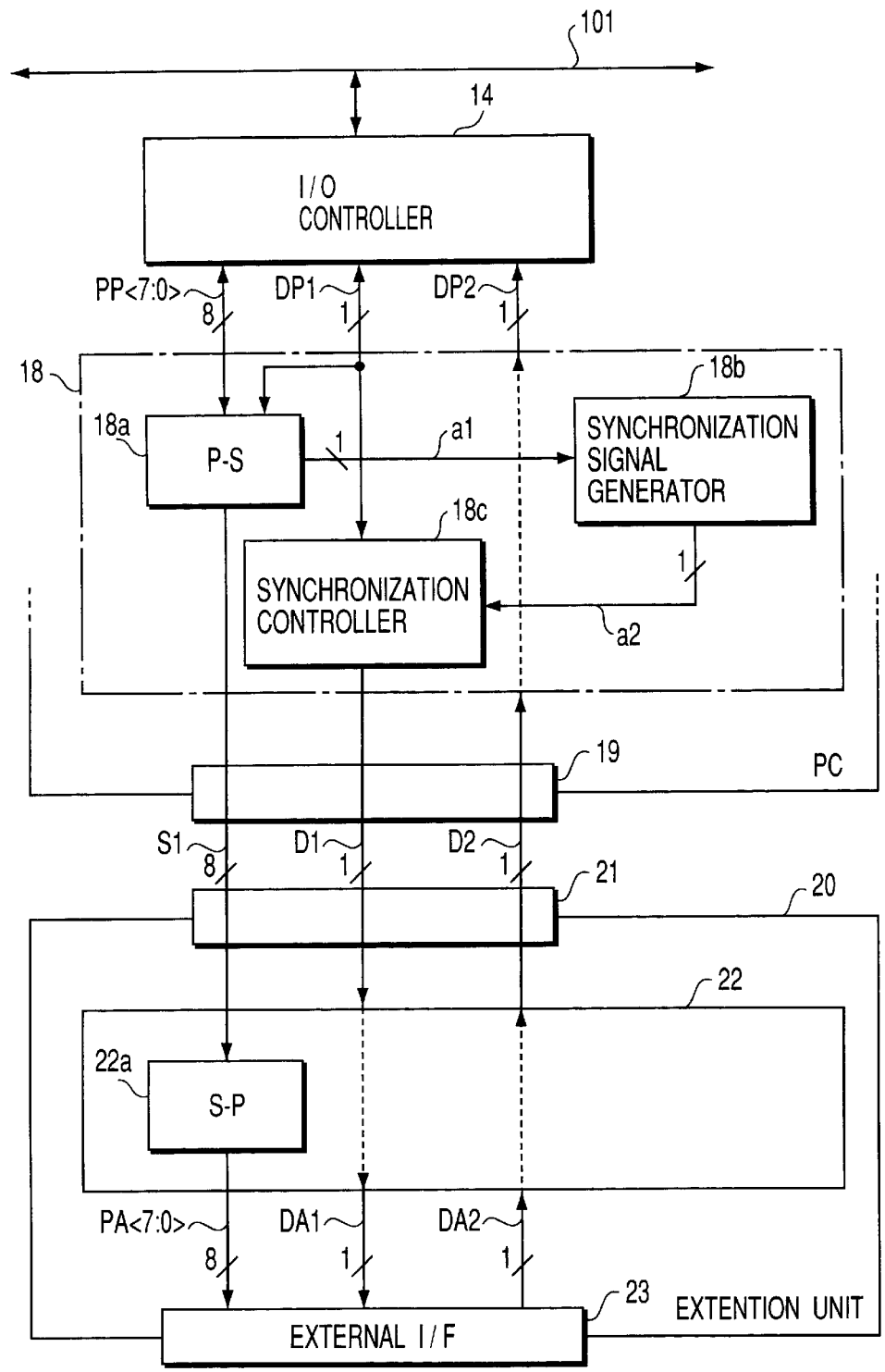
F I G. 2

COMPUTER SYSTEM WITH EXTENSION UNIT CONNECTED TO PERIPHERAL EQUIPMENT

CROSS-REFERENCE TO RELATED APPLICATIONS

This application is based upon and claims the benefit of priority from the prior Japanese Patent Application No. 2000-044582, filed Feb. 22, 2000, the entire contents of which are incorporated herein by reference.

BACKGROUND OF THE INVENTION

The present invention relates to a computer having a connection interface device to extend various functions, an extension unit for extending various functions of the computer, an interface circuit connected between the computer and the extension unit and a computer system.

There is a computer system comprising a computer and an extension unit connected to the computer for extending various functions of, for example, a serial port, a printer port, a PC card, etc. In such a computer system, the computer is connected to the extension unit via a connector. The connector has the lines each of which corresponds to the interface signals required for the various functions.

In such a conventional connection interface device, since the size of the connector depends the number of interface signals directly, it is difficult to reduce the size of the computer.

On the contrary, according to an another conventional computer system, by providing plural types of extension units with limited extension functions (extension unit for PC card, serial port, extension unit for printer port, etc., for example) or by providing plural types of extension units with single function, the size of an extension connector of a computer is reduced, so that the computer itself can be made compact.

However, since extension functions of individual extension units are significantly limited in such functional extension constitution, all the extension functions can not be used simultaneously. In addition, since it is necessary to select an extension unit corresponding to each extension function, which is inconvenient to use and economically disadvantageous for uses.

BRIEF SUMMARY OF THE INVENTION

An object of the present invention, which has been achieved in view of the above-noted problems inherent in the prior art, is to provide a computer can use plural extension functions and be made compact without lowering operational speed.

According to an aspect of the present invention there is provided a computer system comprising a computer; an extension unit for connecting a peripheral equipment to extend functions of the computer; an interface circuit for connecting between the computer and the extension unit; wherein the computer includes: a generator for generating data signals and control signals transmitted to the peripheral equipment; a parallel-serial converter for converting the data signals to serial data signals and serial-transmitting the serial data signals to the extension unit via the interface circuit and a controller for transmitting the control signals in synchronization with a conversion operation of the parallel-serial converter; the extension unit includes a serial-parallel converter for converting the serial data signals to parallel data signals and transmitting the parallel data signals to the peripheral equipment.

According to another aspect of the present invention there is provided a computer comprising: a generator for generating data signals and control signals transmitted to a peripheral equipment; a parallel-serial converter for converting the data signals to serial data signals and serial-transmitting the serial data signals to a serial-parallel converter, which is arranged in an extension unit for connecting the peripheral equipment to the computer, converts the serial data signals to parallel data signals and transmits the parallel data signals to the peripheral equipment; and a controller for transmitting the control signals in synchronization with the a conversion operation of the parallel-serial converter.

According to another aspect of the present invention there is provided a extension unit, the extension unit connecting between a computer and a peripheral equipment, comprising: serial-parallel converter for converting serial data signals generated by the computer to parallel data signals and transmitting the parallel data signals to the peripheral equipment; and a bus for transferring control signals generated by the computer to the peripheral equipment.

According to another aspect of the present invention there is provided a interface circuit, the interface circuit connecting between a computer and an extension unit connected a peripheral equipment, comprising: a first line for transferring serial data signals generated by the computer to serial-parallel converter, which is arranged in an extension unit for connecting the peripheral equipment to the computer, converts the serial data signals to parallel data signals and transmits the parallel data signals to the peripheral equipment; a second line for transferring control signals generated by the computer to a peripheral equipment via the extension unit; and a third line for response signals generated by the peripheral equipment in response to the control signals.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing the schematic representation of a computer, an extension unit and an interface circuit according to a preferred embodiment of the present invention.

FIG. 2 is a block diagram showing the schematic representation of a PC-side signal conversion/restoration circuit provided at the computer and an extension adapter side signal conversion/restoration circuit provided at the extension unit (extension adapter) in the first embodiment.

DETAILED DESCRIPTION OF THE INVENTION

Figure 3:
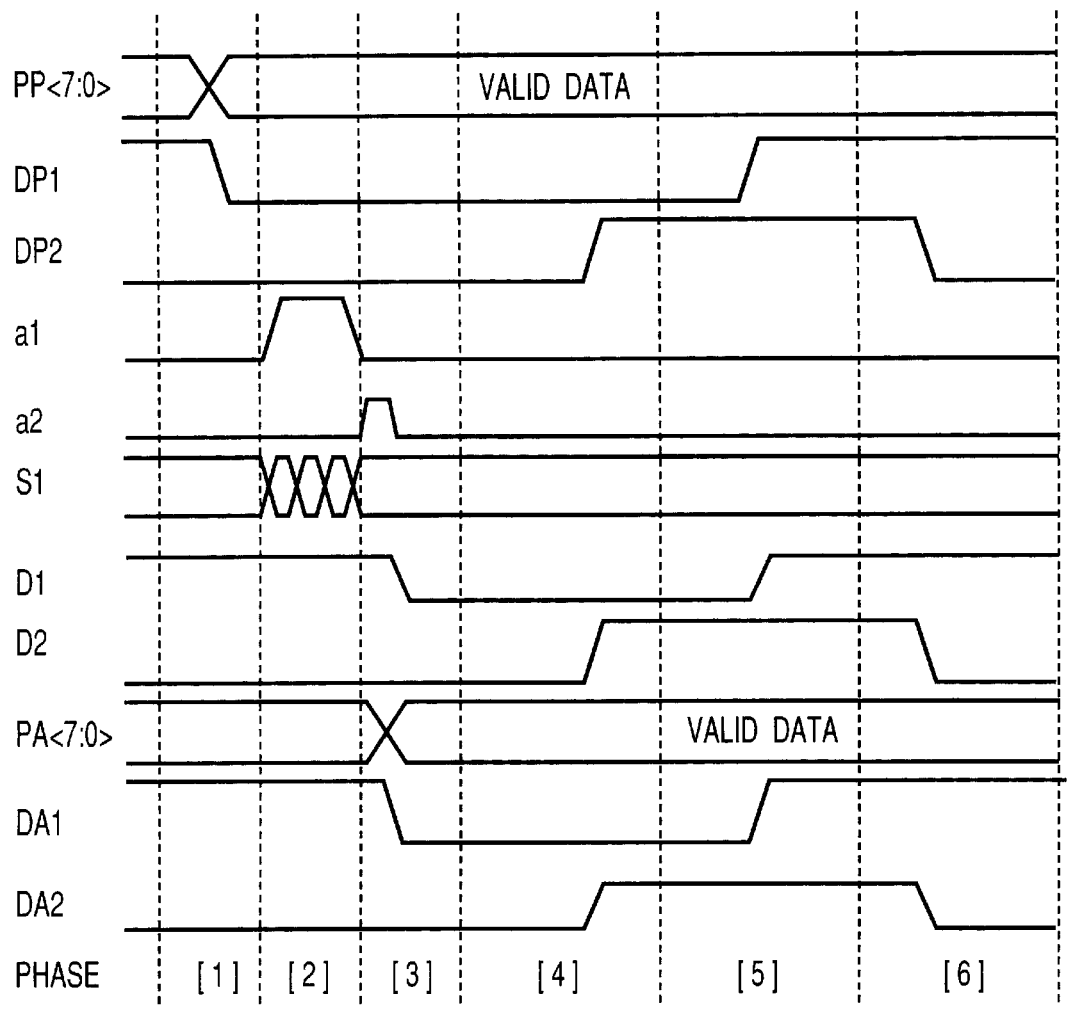
FIG. 3 is a time chart showing timing of signal of each portion shown in FIG. 2.

Some embodiments of the present invention will now be described with reference to the accompanying drawings. In the following description, the constituents of the present invention having substantially the same function and construction are denoted by the same reference numerals so as to avoid an overlapping description, though an overlapping description is repeated where necessary.

(First Embodiment)

The first embodiment of the present invention will be described below referring to the drawings.

FIG. 1 is a block diagram showing the schematic representation of computer system, which comprises a computer 10 an extension unit 20 and an interface circuit, according to the first embodiment of the present invention.

(Computer)

As shown the FIG. 1, the computer (PC) 10 comprises CPU 11, system controller 12, a memory 13, I/O controller 14, a display controller 15, an LCD display part 16, a hard disc drive (HDD) 17, a First conversion circuit 18, a PC-side extension connector 19, a CPU bus 100, a system bus 101 and an extension interface signal line 102. Each of the constitutional elements of the PC 10 has a function described below.

The CPU 11 controls the computer system including the computer 10 and the extension unit 20. The system controller 12 controls data transfer among the CPU 11, a memory 13 and a system bus 101. The memory 13 stores programs be executed by the CPU 11 or the like.

The I/O controller 14 controls an external interface. The display controller 15 drives an LCD display part 16 under the control of the CPU 11, and the LCD 16 displays visual representation of data under the display control of the display controller 15. The hard disc drive (HDD) 17 stores programs and data to be loaded in the memory 13.

The first conversion circuit 18 is characteristic element of PC 10 and intermediates data transmission between the I/O controller 14 and a second conversion circuit 22 arranged in the extension unit 20. The first conversion circuit 18 will be described in detail later with reference to FIG. 2.

The PC-side extension connector 19 is a connector to attach cables for extension devices such as display stations, printer or the like. The PC-side extension connector 19 has pins for transmitting serial data signals and control signals described later.

The CPU bus makes access by the CPU 11 to each function part through the system controller 12. The system bus 101 connects between each function parts in the system. The extension interface signal line 102 connects between the I/O controller 14 and the first conversion circuit 18.

(Extension Unit)

The extension unit (extension adapter) 20 comprises an adapter-side connector 21 to be connected to the PC-side extension connector 19, the second conversion circuit 22 for intermediating data transfer between the first conversion circuit 18 and a peripheral equipment connected to the extension unit 20, and an external interface part 23 for 23 for connecting a peripheral equipment (external device) to the extension unit 20.

(Interface Circuit)

An interface circuit 40 is a device for connecting between the PC 10 and the extension unit 20. The interface circuit 40 comprises a serial bus 103 and a direct signal line 104. The serial bus 103 transmits an extension interface serial signal from the first conversion circuit 18 at the PC 10 side to the second conversion circuit 22 at the extension unit 20. The direct signal line 104 transmits direct signal synchronized to the extension interface serial signal from the first conversion circuit 18 at the PC 10 side to the second conversion circuit 22.

(Signal Transmission/Reception)

The transmission/reception of the signal between the pc 10 and the extension unit 20 is one of the features of the present embodiment. The transmission/reception of the signal between the pc 10 and the extension unit 20 is realized by the constitutional elements shown in FIG. 2.

FIG. 2 is a block diagram showing the schematic representation of a first conversion circuit 18 provided at the computer (PC) 10, the PC-side connector for extension 19, the adapter side connector 21 and the second conversion circuit 22 provided at the extension unit (extension adapter) 20 in the first embodiment.

As shown in FIG. 2, the first conversion circuit 18 comprises a parallel-serial (P-S) converter 18a, a synchronization controller 18b and a synchronization signal generator 18c.

The P-S converter 18a converts a data signal, for example (PP <7:0>), from the I/O controller 14 to a serial data signal (S1) and transmits to the second conversion circuit 22. Note that, the PP <7:0> is the data signals in the byte width unit and given as an example of a part of the interface signals for extension output of the I/O controller 14. Also, the P-S converter 18a generates a timing signal a1 and outputs the timing signal a1 to the synchronization signal generator 18b.

The synchronization signal generator 18b generates a synchronization timing signal a2 in response to the timing signal a1 from the P-S converter 18a and outputs the synchronization timing signal a2 to the synchronization controller 18c. On the basis of the synchronization timing signal a2, the synchronization controller 18c determines the timing of outputting an interface signal (DP1) from the I/O controller 14 to the PC-side extension connector 19. The interface signal (DP1) is a control data signal for controlling the extension unit 20 and is output via the PC-side extension connector 19 as an extension direct signal (D1).

The synchronization controller 18c controls outputting the interface signal (DP1) corresponding to the (PP <7:0>) to the second conversion circuit 22 via the direct signal line 104 in such a manner that the interface signal (DP1) is output in synchronization with the timing signal a2.

As shown in FIG. 2, the interface circuit 40 transfers a serial data signal S1, a control data signal D1 and a control data signal D2. The serial data signal S1 is output onto the serial bus 103 (see FIG. 1). Concretely, the serial data signal S1 is a data signal in the byte width unit output from the I/O controller 14, for example (PP <7:0>) or the like, the data signal converted to serial signals by P-S converter 18a and output on the serial bus 103.

On the contrary, the control data signals D1 and D2 are handshake signals for serial transmission of the data signal S1. The control data signals D1 and D2 are output directly onto the direct signal line 104 of the interface circuit and transmitted to the extension unit 20. The control data signal D1 corresponds to signal DP1 output by the I/O controller 14 and signal DA1 input by the external interface part 23. The control data signal D2 corresponds to signal DP2 input by the I/O controller 14 and signal DA2 output by the external interface part 23.

In the computer system according to this embodiment, it is one of the features that the control data signals, which affects the speed of the operation of the computer system, are transmitted directly, and the data signals, such as (PP <7:0>) are serial-transmitted between the computer 10 and the extension unit 20.

The second conversion circuit 22 comprises a serial-parallel (S-P) converter 22a. The S-P converter 22a converts the serial signals S1 transmitted from the first conversion circuit 18 to a parallel signals, such as (PA <7:0>), in the original byte unit.

The interface signals DA1 and DA2 are handshake signals handled at the extension unit 20 for serial transmission of the data signal PP <7:0>. The interface signals DA1 and DA2 correspond to the interface signals for extension DP1 and DP2 at the computer (PC) 10 and the direct signals for extension D1 and D2 on the direct signal line 104 respectively.

Next, an example of the operation performed by computer system of the present embodiment will now be described in detail with reference to FIG. 3.

FIG. 3 is a time chart showing timing of signals of each part shown in above FIG. 2 and here shows an operation example when a data signal in the byte width unit (PP <7:0>) to be serially transmitted, which is put out of the I/O controller 14 and a part of the interface signal for extension is transmitted to the peripheral equipment connected to the external interface part 23.

Incidentally, as shown in FIG. 3, among the PC-side interface signals for extension put out of the I/O controller 14, a data signal in the 1 byte width unit (PP <7:0>) is transmitted to the extension unit (extension adapter) 20 by handshake of the two signals DP1 and DP2 for serial transmission of the data signals concerned. At this time, among the above handshake signals put out of the I/O controller 14, the signal DP1 is changed from the "High" level to the "Low" level, and it is shown that data transmission is started, that is, the I/O controller 14 puts out the above data signal PP <7:0> (Valid Data) onto the interface signal line for extension 102. Moreover, the signal DP2 is changed to the "High" level and then, the signal DP1 is changed to the "High" level and finally, the signal DP2 is changed to the "Low" level, and it is shown that data transmission has been completed.

In the phase [1] shown in FIG. 3, the P-S converter 18a provided at the first conversion circuit 18 determines that the data signal PP <7:0> becomes valid by the receiving the signal DP1 at the "Low" level.

In the phase [2] shown in FIG. 3, the parallel-serial converter 18a outputs the timing signal a1 of parallel-serial conversion shown in FIG. 3 to the synchronization signal generator 18b, latches the data signal PP <7:0>, then converts the data signal PP <7:0> to a serial-signal and outputs this converted serial-signal S1 onto the serial bus 103.

In the phase [3] shown in FIG. 3, the synchronization signal generator 18b determines that the serial-signal is being transmitted by the receiving the timing signal a1 and outputs the synchronization timing signal a2 to the synchronization controller 18c according completion of serial transmission. The synchronization controller 18c determines the completion of serial transmission by receiving the synchronization timing signal a2 output of the synchronization signal generator 18b and outputs the signal D1 according to the signal DP1 at the "Low" level onto of the direct signal line 104.

Then, in the phase shown in FIG. 3, the serial-parallel (S-P) converter 22a in the second conversion circuit 22 provided at the extension unit 20 inputs the serial-signal S1 on the serial bus 103. The S-P converter 22a converts the serial-signal S1 to the parallel-signal PA <7:0> and outputs the parallel-signal PA <7:0> to the external device connected to the external interface part 23 concerned.

Moreover, with the signal DP1 changing to the "Low" level, as shown in FIG. 3, the signal D1 is changed to the "Low" level. In response to the signal D1 at the "Low" level, the "Low" level-signal DA1 is output to the external device connected to the external interface part 23 concerned.

In the phase [4] shown in FIG. 3, the peripheral equipment (external device) connected to the external interface part 23 changes the signal DA2 to the "High" level in response to the signal DA1 at the "Low" level.

The "High" level-signal DA2 is output via the adapter side connector 21 onto the direct signal line 104 as the signal. Moreover, the "High" level-signal D2 on the direct signal line 104 is directly transmitted via the PC-side extension connector 19 to the I/O controller 14 as the signal DP2.

In the phase [5] shown in FIG. 3, the I/O controller 14 changes the DP1 signal to the "High" level in response to the "High" level-signal D2.

In the phase [6] shown in FIG. 3, the external device connected to the external interface part 23 responds by changing the signal DA2 shown in FIG. 3 to the "Low" level as the signal DP1 shown in FIG. 3 is changed to the "High" level.

This "Low" level-signal DA2 is directly transmitted to the I/O controller 14 via the direct signal line 104.

According to this configuration, the control data signal, which affect the operational-speed of the computer system substantially, is transmitted directly as the signal D1 or D2 between the PC 10 and the extension unit 20. On the other hand, the parallel data signal, which does not affect the operational-speed of the computer system substantially, is transmitted as the serial data signal-s1 from the PC 10 to the extension unit (extension adapter) 20.

Consequently, with the computer system, the computer and the extension unit, the number of signals of the PC-side extension connector 19 for connecting between the computer 10 and the extension unit 20 and the adapter side connector 21 can be reduced, and by passing the handshake signal directly through the above connectors 19 and 21, delay due to serial transmission can be minimized.

(Second Embodiment)

In the second embodiment, the modification of computer (PC) 10 comprising the first conversion circuit 18 according to the present invention will be described.

Figure 4:
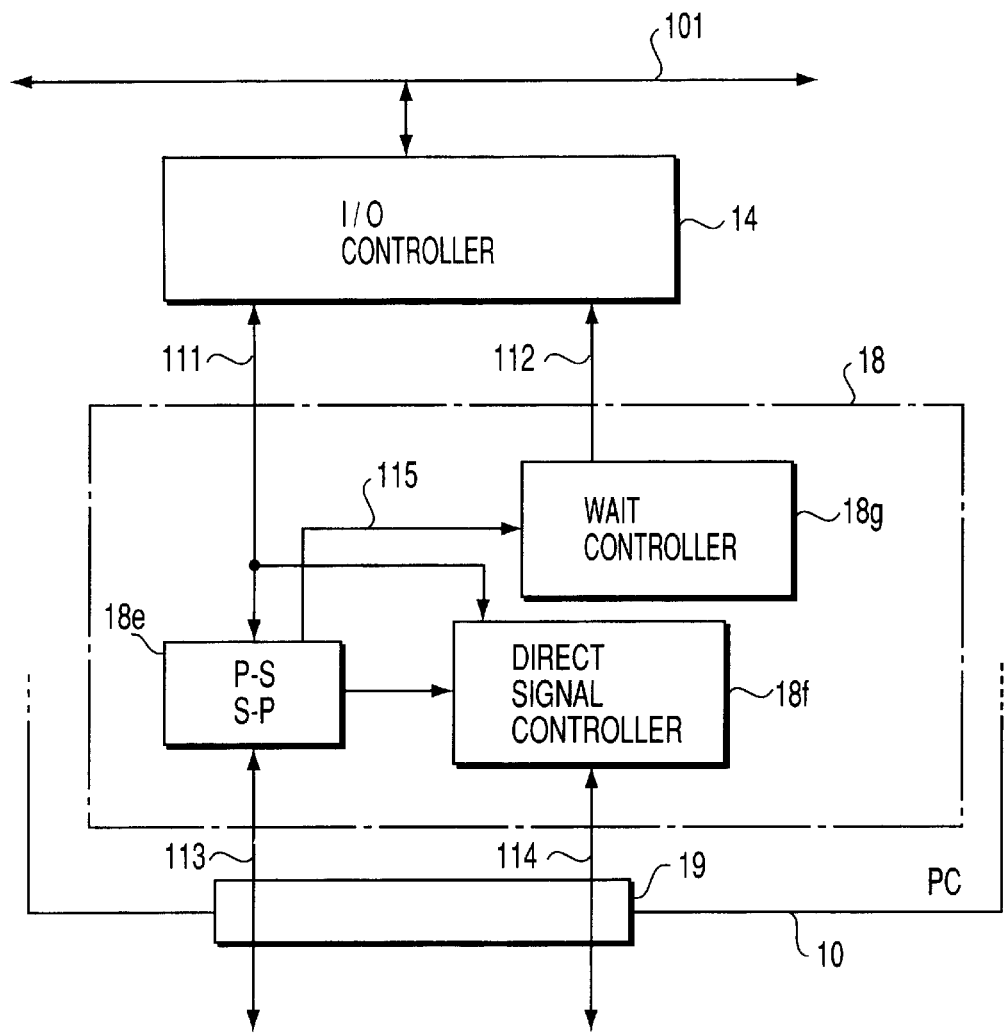
FIG. 4 is a block diagram showing the schematic representation of a PC-side signal conversion/restoration circuit provided at the computer according to another preferred embodiment of the present invention.

FIG. 4 shows the PC 10 according to the second embodiment of the present invention and is a block diagram showing an example of the first conversion circuit 18. With reference to FIG. 4, a function to stop system bus 101 operation in transmitting serial data, which is realized by the PC 10, will be described below. With this function to stop system bus 101 operation, the conversion and transmission of data signal do not affect program processing of the CPU 11 or can be consistent with program processing.

As shown in FIG. 4, the first conversion circuit 18 comprises a parallel-serial mutual converter 18e, a direct signal controller 18f and a wait controller 18g. The parallel-serial mutual converter 18e has both conversion functions of the parallel-serial (P-S) converter 18a and the serial-parallel (S-P) converter (S-P) 22a shown in FIG. 2. The direct signal controller 18f has both functions of the synchronization signal generator 18b and the synchronization controller 18c shown in FIG. 2. The wait controller 18g generates waiting signals 112 and outputs the waiting signals 112 to the I/O controller 14. Incidentally, data signals 111 includes a data signal in the byte width unit shown in FIG. 2 (PP <7:0>) and a PC extension external interface signal as the direct signals DP1 and DP2 for handshake.

Next, the function to stop the system bus 101 operation will be described below. Firstly, the parallel-serial mutual converter 18e outputs a signal 115 to inform the starting of transmitting of serial data signals to the wait controller 18g. The wait controller 18g generates the waiting signals 112 in response to the receiving of the signal 115. When the I/O controller 14 inputs the wait signal 112, the I/O controller 14 stops the system bus 101 operation during the transmission of the serial data.

That is, in general, receiving some signal form the CPU 11 or the like, the I/O controller 14 transmits the information signal to inform the CPU 11 or the like of the receiving. When The I/O controller 14 inputs the waiting signals 112, the I/O controller 14 delays the transmission the information signal to the CPU 11 or the like cording to the waiting signals 112. Note that, the waiting signals 112 includes information to delay the transmission the information signal by predetermined time.

According to the above-described arrangement, the following effects can be obtained.

The conversion and transmission of the data signal, which is performed of the parallel-serial mutual converter 18e, do not affect program processing of the CPU 11 or can be consistent with program processing. Therefore, access to the I/O controller seen from the program becomes apparently equivalent to the time when serial transmission is not executed, whereby modification of existing programs can be made unnecessary.

The number of signals to PC extension interface can be reduced, the size of the extension connector can be easily made smaller, and lowering of operational-speed can be suppressed.

Moreover, a small-sized connector for PC extension which can use all the extension functions at the same time can be realized.

In the computer 10 according to each of the embodiments, explanation was given with the serial transmission as an example that the data signal in the byte width unit (PP <7:0>) put out from the I/O controller 14 is converted to serial and sent out to the external device connected to the extension unit 20, but not limited to this, the present invention can be applied to other various data transmission between the computer 10 and the extension unit 20.

According to each of the embodiments, which has been described in detail, all the extension functions which can be realized on the system can be used simultaneously, and the size of a connector for extension can be reduced without incurring lowering of operational-speed, whereby such a computer system, a computer, an extension unit and an interface circuit of the extension unit the device can be provided that the constitution of the entire system can be made compact.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer system comprising:
   a main body of a computer;
   an extension unit connected to a peripheral equipment to extend functions of said main body of said computer;
   a first signal line configured to serially transmit serial data signals between said main body of said computer and said extension unit;
   a second signal line configured to directly transmit control signals between said main body of said computer and said extension unit;
   wherein said main body of said computer includes:
      a generator configured to generate data signals and a first control signal transmitted to said peripheral equipment;
      a parallel-serial converter configured to convert the data signals into the serial data signals and serially transmit the serial data signals to said extension unit via said first signal line; and
      a controller configured to transmit the first control signal via said second signal line in response to a completion of a serial-transmission of the serial data signals to make the first control signal bypass said first signal line;
   wherein said extension unit includes a serial-parallel converter configured to convert the serial data signals into parallel data signals and transmit the parallel data signals to the peripheral equipment.

2. The computer system according to claim 1, wherein said peripheral equipment generates a handshake signal and transmits the handshake signal to said controller, and
   said controller outputs a second control signal to an I/O controller of said main body of said computer via said extension unit in synchronism with an input of the handshake signal, the second control signal being a handshake signal to transmit the data signals from said peripheral equipment to said I/O controller via said extension unit.

3. The computer system according to claim 1, wherein said generator generates a timing signal in a period of a parallel-serial transformation by said parallel-serial converter and transmits the timing signal to said controller, and said controller starts to transmit the first control signal directly in response to a completion of a transmission of the serial data signals.

4. A computer system comprising:
   a main body of a computer;
   an extension unit to a peripheral equipment to extend functions of said main body of said computer;
   a first signal line configured to serially transmit data signals between said main body of said computer and said extension unit;
   a second signal line configured to directly transmit control signals between said main body of said computer and said extension unit;
   wherein said main body of said computer includes:
      a generator configured to generate data signals and a first control signal transmitted to said peripheral equipment;
      a parallel-serial converter configured to convert the data signals into the serial data signals and serially transmit the serial data signals to said extension unit via said first signal line;
      a controller configured to transmit the first control signal via said second signal line in response to a completion of the serial-transmission of the serial data signals to make the first control signal bypass said first signal line; and
      a wait controller configured to inhibit said generator from transmitting a signal to a CPU when said parallel-serial converter serially transmits the serial data signals to said extension unit, and wherein said extension unit includes a serial-parallel converter configured to convert the serial data signals to parallel data signals and transmit the parallel data signals to said peripheral equipment.

5. An apparatus comprising:

a generator configured to generate data signals and a control signal transmitted to a peripheral equipment;

a parallel-serial converter configured to convert the data signals into serial data signals and serially transmit the serial data signals to an extension unit via a first signal line; and a controller configured to transmit the control signal via a second signal line in response to a completion of the serial-transmission of the serial data signals to make the control signal bypass the first signal line.

6. An apparatus comprising:

a generator configured to generate data signals and a control signal transmitted to a peripheral equipment;

a parallel-serial converter configured to convert the data signals into serial data signals and serially transmit the serial data signals to an extension unit via a first signal line; and a controller configured to transmit the control signal via said second line in response to a completion of the serial-transmission of the serial data signals to make the control signal bypass the first signal line; and a wait controller configured to inhibit said generator from transmitting a signal to a CPU when said parallel-serial converter serially transmits the serial data signals to said extension unit, and wherein said extension unit includes a serial-parallel converter configured to convert the serial data signals to parallel data signals and transmit the parallel data signals to the peripheral equipment.

7. An interface circuit connected between a computer and an extension unit, the interface circuit comprising:

a first signal line configured to serially transmit serial data signals generated by said computer to a serial-parallel converter which is arranged in said extension unit, the serial-parallel converter configured to convert the serial data signals into parallel data signals, and transmits the parallel data signals to a peripheral equipment;

a second signal line configured to directly transmit a control signal generated by said computer to said peripheral equipment via said extension unit; and a third line configured to transfer a signal generated by said peripheral equipment in response to the control signal.

* * * * *